UNITED STATES PATENT OFFICE.

CHARLES H. PHILLIPS AND LAWRENCE REID, OF NEW YORK, N. Y., ASSIGNORS TO CHARLES H. PHILLIPS, OF SAME PLACE.

IMPROVEMENT IN MAKING A HYDRATE OR MILK OF MAGNESIA.

Specification forming part of Letters Patent No. 141,167, dated July 22, 1873; application filed June 4, 1873.

*To all whom it may concern:*

Be it known that we, CHARLES H. PHILLIPS and LAWRENCE REID, of New York, in the county of New York and State of New York, have invented certain Improvements in the Process of Making Hydrate of Magnesia and an Aqueous Mixture of the same, termed by us "Milk of Magnesia," of which the following is a specification:

Our invention consists in a new and improved process of manufacturing or preparing a superhydrate of the oxide of magnesium or superhydrate of magnesia, by means of which we obtain it in a pure form for medical and other purposes, but more especially for the former, it, for this purpose, being intended to be administered as an aqueous mixture, termed by us "milk of magnesia," and for which Letters Patent were granted to us on the 29th day of April, 1873, and numbered 138,282.

In preparing superhydrate of magnesia the utmost care is exercised by us, as well in the selection of the material from which it is to be made as in the conducting of the process itself, in order to obtain it perfectly pure. The material having been carefully selected, we take, in order to manufacture one hundred gallons of milk of magnesia, one hundred and twenty-five pounds of pure sulphate of magnesia and dissolve it in two hundred gallons of distilled water, filtering it afterward through paper, if necessary or desirable. We then add a solution of pure caustic soda or potash, in sufficient quantity to free and precipitate the magnesia from the sulphuric acid with which it was previously combined. For this purpose about fifty-seven pounds of the real soda, or about eighty-six pounds of the real potash, completely dissolved, are requisite to produce the desired result.

The two solutions above mentioned, on being added the one to the other, are then thoroughly mixed and incorporated with each other by any suitable mechanical appliance, and although chemical decomposition almost instantly ensues, the stirring and mixing are continued for some time thereafter, so as to insure a perfect decomposition and chemical reorganization of the elements of the solutions used. The length of time necessary for such purpose need not be long, but we deem it advisable to continue the agitation from a very few minutes to half an hour, and even a longer time may be beneficial. The product of this operation is an insoluble superhydrate of magnesia diffused through the mother-liquor, and which consists of an aqueous solution of the sulphate of the alkali employed.

The chemical process having been completed, the solution and mixture are allowed to settle for about twenty-four hours, or thereabout, and the clear liquor then drawn off, after which more distilled water is added in quantity sufficient to replace the liquor withdrawn, and the whole thoroughly stirred and mixed for any suitable length of time, and again allowed to settle, and the clear liquor afterward drawn off, as before.

After the second or third washings are completed, and fresh water added, say, for the fourth washing, the mixture may then be subjected to boiling for half an hour or more, in some suitable vessel or boiler, through the aid of steam, either by the diffusion of the steam throughout the mass, from the open end of a steam-pipe, or by steam through the medium of a double or jacketed boiler or vessel; or it may be effected by a coil of pipe arranged in the bottom of the vessel or boiler, through which steam, &c., from the boiler, is made to pass and discharge either on the inside or outside of the boiler; or this pipe may be perforated with a great number of small holes, through which the steam may be injected into the boiler in small jets, for the purpose of agitation, in which event the coil, if desired, may be closed at its outer end, and made removable by unscrewing the coupling which connects it with the main steam-pipe; or, instead of a coil for that purpose, it may consist of a series of small pipes connected to one main feed-pipe, and the latter with the steam-pipe of the boiler, and from which, like the others, it can be disconnected for removal, if desired; or the boiling may be accomplished in any other suitable manner. But in all cases while the boiling continues, and even for some little time after, sufficient agitation, either through the direct action of the steam, or else by some suitable mechanical appliance, must be employed to prevent the coagulation and accumulation on the bottom and sides of the vessel of the magnesia. This done, the solution and mixture are allowed to settle for twenty-four hours, or thereabout, as before, and the clear liquor, containing a portion of the soluble sulphate of the alkali employed, then drawn off. More distilled water is then added to the boiler, in quantity sufficient to replace the liquor withdrawn, and steam or heat with agitation applied, as before. The boiling is then allowed to continue as long as in the former case, and the solution again allowed to settle, and which will consume about the same length of time as before, when the clear liquor is to be again drawn off, and the same operations repeated for some seven or eight times with the addition of fresh distilled water each time, so as to effectually remove from the precipitated magnesia the sulphate of the alkali formed during the process of reducing it from its state of combination as a sulphate to its present condition as a superhydrate. The supernatant liquor resulting from the last boiling should not only be tasteless, but should yield no precipitate with the exhibition to it of a solution of nitrate of barytes slightly acidulated with nitric acid; otherwise the operations must be repeated until it comes up to the test requirements; or, instead of using cold water for the first three or four of the operations, the whole process may be conducted from the very commencement by boiling, say, for half an hour each time; but, as before, agitation must be kept up during and even for some time after the boiling process has been completed; but I prefer the former method, as the boiling of the mixture in the first place seems to impart a bitter taste to the product very difficult to remove by subsequent washings. The last or test liquor having been drawn off, the remainder may be again washed, if desired or deemed advisable, with fresh distilled water, and allowed to settle, and that then drawn off also. We then add as much pure distilled water as will dilute the mass of magnesia to a thin consistency, and which shall contain about twenty grains of pure magnesia per fluid ounce, or about four times as much real magnesia as there is contained in any of the so-called fluid magnesia preparations now in use—a point of considerable importance in administering medicine to infants and invalids; but while that is about the strength it will be generally made and offered for sale, we do not propose to confine ourselves to such proportions, as it may be made weaker or stronger to any required extent, in order to meet the requirements of the profession and the public, and this simply by diminishing or increasing the quantity of water with which the magnesia is mixed, according as the mixture is required to be made weak or strong; but twenty grains per fluid ounce we find answers an admirable purpose, and may in that form be administered in suitable quantity to young or old without hesitation or danger.

We have described the sulphate of magnesia as the source from which we obtain the magnesia in this preparation; but any other pure soluble salt of magnesia will answer the same purpose—such as chloride of magnesium. And in regard to the caustic soda or caustic potash used by us, although these articles can be obtained tolerably pure, still we prefer and consider it better to prepare their caustic solutions from their pure carbonates by the agency of lime and water by the usual process known to chemists, or by any other process by which we can obtain them or either of them in a pure form. And though we prefer to use silver vessels in making this preparation, still earthenware or wooden vessels may be employed.

Having thus described what we consider the best process for procuring a pure superhydrate of magnesia by the action of a pure caustic alkali upon the soluble salts of magnesia, we may allude to a modification of the process, which depends on filtration and washing with pure distilled water for the separation of the alkaline sulphate from the precipitated magnesia, instead of boiling and drawing off the liquor. In this process we precipitate our magnesia from the sulphate of magnesia with caustic alkali, as before, using for this purpose the same materials and proportions of materials. The whole is then placed on filters and repeatedly washed with pure distilled water until the washings no longer give evidence of the presence of sulphates upon being tested with nitrate of barytes, as before described. The pulpy mass is then mixed through sieves and by agitation with a sufficiency of water to bring it to the required strength in order to produce our milk of magnesia. Great difficulties are experienced in this operation because of insufficiency and tediousness of the washing and the presence of coagulated lumps of superhydrate of magnesia, which interferes with the smoothness and fluidity and consequent efficacy of the magnesia, for which reasons we prefer to keep the magnesia in the fine state in which it is originally precipitated by using the open steam process; or, instead of boiling the soluble salts of magnesia and the caustic alkalies together, the operation may be conducted without the application of heat in any form, in which case the same materials and proportion of materials will still be used, and the mixture kept in a state of agitation until the chemical action of the caustic alkali upon the soluble salts of magnesia employed has been thoroughly effected, on which the new compound is allowed to settle, and the supernatant liquor drawn off, as before, and the residuum then treated with repeated washings with pure distilled but cold water, accompanied by agitation, as in the former way, it differing in no respect from that, save that the heating or boiling process is omitted; but, while a fair product can be obtained in this way, we prefer the manipulation first described, as not only being more expeditious, but for the reason that the product is finer and smoother, and in some respects possibly purer and better.

Having thus described our invention, what we claim as new is—

The process herein described of preparing a pure superhydrate of magnesia, to wit, by subjecting a soluble salt of magnesia to the action of a caustic alkali, in the manner substantially as set forth.

CHAS. H. PHILLIPS.
LAWRENCE REID.

Witnesses:
JOHN H. STITT,
CHAS. E. H. PHILLIPS.